United States Patent [19]
Cohen et al.

[11] Patent Number: 5,231,568
[45] Date of Patent: Jul. 27, 1993

[54] PROMOTIONAL GAME METHOD AND APPARATUS THEREFOR

[75] Inventors: Leopold Cohen, Las Vegas, Nev.; Charles I. Bernhaut, North Brunswick, N.J.; Robert T. Grindell, Sunrise, Fla.

[73] Assignee: Impact Telemedia, Inc., Fort Lauderdale, Fla.

[21] Appl. No.: 821,988

[22] Filed: Jan. 16, 1992

[51] Int. Cl.⁵ .................... G06F 15/28; A63F 5/04
[52] U.S. Cl. ............................ 364/401; 364/410; 273/139 A
[58] Field of Search ............... 364/410, 411, 412, 400, 364/401; 283/51, 56, 901, 903, 102; 273/138 A, 139

[56] References Cited
U.S. PATENT DOCUMENTS

| | | | |
|---|---|---|---|
| 3,594,760 | 7/1971 | Haker | 340/325 |
| 4,072,930 | 2/1978 | Lucero et al. | 340/152 T |
| 4,335,809 | 6/1982 | Wain | 194/1 R |
| 4,573,681 | 3/1986 | Okada | 273/143 R |
| 4,652,998 | 3/1987 | Koza et al. | 364/412 |
| 4,669,729 | 6/1987 | Solitt et al. | 273/138 |
| 4,674,041 | 6/1987 | Lemon et al. | 364/401 |
| 4,723,212 | 2/1988 | Mindrum et al. | 364/401 |
| 4,775,935 | 10/1988 | Youick | 364/401 |
| 4,882,473 | 11/1989 | Bergeron et al. | 235/380 |
| 4,943,090 | 7/1990 | Fienberg | 273/139 |
| 4,982,346 | 1/1991 | Girouard et al. | 364/550 |
| 5,002,313 | 3/1991 | Salvatore | 283/102 |
| 5,007,641 | 4/1991 | Seidman | 273/138 |
| 5,038,022 | 8/1991 | Lucero | 235/380 |
| 5,083,271 | 1/1992 | Thacher et al. | 364/411 |
| 5,085,308 | 2/1992 | Wilhem | 194/205 |

FOREIGN PATENT DOCUMENTS 0070613  1/1983  European Pat. Off.

OTHER PUBLICATIONS

"Match the Super Star" ©1978 Coca-cola Corp.

*Primary Examiner*—Roy N. Envall, Jr.
*Assistant Examiner*—A. Bodendorf
*Attorney, Agent, or Firm*—Lerner, David, Littenberg, Krumholz & Mentlik

[57] ABSTRACT

A patron inserts a coded game card into a game machine which reads the code and determines whether the game card has been played within a designated time period. If the game card has been played within such period, the game machine is not permitted to operate and displays that game card's previous time of play. If the card has not been played within the time period, the machine operates and randomly positions a number of product or services representations with respect to one another. Prescribed combinations of the representations, including at least one pair of matched representations, permits the patron to obtain as a prize the product or service whose representations matched In addition to bearing a unique patron code, the game card can also contain establishment codes which only permit a game card to be played at particular establishments. Other game cards can be specially coded to provide maintenance instructions to the game machine.

32 Claims, 5 Drawing Sheets

PROMOTIONAL GAME METHOD AND APPARATUS THEREFOR

BACKGROUND OF THE INVENTION

1. Field of the Invention

The present invention relates to games, and more particularly, relates to games wherein prizes are awarded, which prizes are the products displayed as a result of playing the game.

2. Description of the Prior Art

Various establishments seek to promote certain of their products by offering more attractive prices on those products as by buy one-get one free, cents-off or other coupons, or by giving samples of the product individually or associated with other products.

Most of the coupons employed, whether they are mailed to the household or clipped from the newspaper, must be brought to a store to be redeemed. The consumer must remember to clip or collect the coupon and remember to bring it to a store for redemption. Once at the store, the customer must remember to get the items shown and to turn in their coupons. Because many coupons are never redeemed, the manufacturer does not achieve the type of response he desires. Also, since the coupons may have long expiration dates or no expiration date at all, statistical data regarding the promotion may not be available for a long time after the promotion is concluded.

In one gaming system, as described in U.S. Pat. No. 5,007,641 issued Apr. 16, 1991, a number of tokens having the same common code are distributed to patrons by the establishment or packaged with the product line to be promoted. The tokens must be brought by the patron to the establishment and played in the game device. Certain of the tokens result in the award of a prize which must be claimed at a redemption booth. The use of the game device does not display the manufacturer's products, improving his memory of such products and possibly triggering a desire to purchase the products shown, and the prizes awarded bear no resemblance to the code shown on the token or the machine display.

In another system, that shown in U.S. Pat. No. 4,723,212 issued Feb. 2, 1988, the purchase of certain products causes the generation of discount coupons which permit the purchase of products different than the ones then purchased. Each item purchased is examined to see if a coupon is to be generated, and when all items have been examined and the maximum number of coupons determined, a suitable number of discount coupons are printed and issued. The patron does not take part in the process other than originally selecting the products. He does not see a display of the manufacturer's products and the prizes awarded, if any, are intentionally different than the ones the patron has selected.

A further known device disclosed in U.S. Pat. No. 4,982,346 issued Jan. 1, 1991 shows visual ads of various products and dispenses coupons if the patron wins. The win is determined by matching the number on a readable card with a pre-selected set of winning numbers on the device. Again, the actual prize is not shown by the device and the prize bears no direct relationship to what is shown.

Thus, despite the considerable effort that has gone into the development of many different systems, there remains a need for a simple system which will attract the attention of potential customers and which can acquaint these customers with products and/or services being promoted by a business, depend upon the number of product representation matches on the game screen or display.

The present invention addresses these needs.

SUMMARY OF THE INVENTION

One aspect of the invention provides a promotional gaming method which includes the steps of establishing at least two separate series of product representations, at least some of which are present in both series, and randomly placing the two series with respect to one another. One representation of a product on a first series may at times be aligned with one representation of the product on the other series to form a match. The method further includes the step of awarding a prize to the patrons who form such a match. Most preferably, the prize is the product shown by the matched representations or a discount coupon related to such product.

In preferred methods according to this aspect of the invention, each patron who wishes to play the promotional game in an effort to win prizes obtains a game card by registering at a suitable service desk. Certain identifying information about the patron is recorded and a uniquely coded game card is issued to such patron and cross-referenced against his identifying information. The game card desirably also includes a code identifying the establishment in which the game card can be played.

In these preferred methods, the patron takes his game card and inserts it into a game machine to initiate play. In highly preferred methods, the establishment code is first checked to determine whether the game card is entitled to be played on that game machine. The unique code of the game card identifying the patron is then checked against the stored codes of game cards played within a prescribed period, such as 24 hours, and if it is found already stored, signifying that it has initiated play within the last 24 hour period, the game machine is locked out and the date, time and a message are displayed on a visual display of the game machine.

In the event no match is found with stored codes, the random selection device is operated and a visual display of the peripheral surfaces of three adjacent wheels is shown by the game machine. On these peripheral surfaces are depicted a series of products, manufacturer and market symbols and other indicia. Since the three wheels spin independently, each can stop at a different location or the same location causing a no-match or a full match condition and every combination in between. Based upon the matches achieved or the symbol/indicia combinations which result, prizes can be awarded. Alternatively, certain selection criteria can be established so that a prize is awarded each given number of plays and the prize distribution as to type and amount fixed among those preselected winning plays. Winners could also be established based on preselected game card codes or at preselected times so that a patron playing at, say, 1:04 p.m. could automatically be a winner. As to individual patrons this would still be considered a random selection of winners. For each patron who plays on the selected winning play the desired matches can be generated.

Another aspect of the invention provides a game machine for playing the promotional game. The game machine includes a display for establishing at least two separate series of product representations at least some of which are present in both series, the two series being capable of random placement with respect to one another so that at least one of the representations in one of the series at times can match at least one of the representations in another of the series. The game machine further includes movement means for moving the series of product representations with respect to one another and means for signaling that a match exists between one representation of a product on one of the series and one representation of the product on another of the series. Also, means are provided for awarding a prize on the occurrence of the match.

In preferred embodiments of the game machine, the unique code on a game card inserted into the game machine actuates the movement means. In highly preferred game machines, maintenance cards inserted into and read by the game machine instruct the game machine to perform certain non-game functions.

The game machine itself can be set to dispense pre-printed coupons or can contain a printing device to print on blank or partially pre-printed tape to form a coupon. Alternatively, a signal can be sent to a remote location such as a service or courtesy desk where the coupon can be issued or arrangements made for receiving the prizes at no or a reduced cost.

The game machine can be used to display the fact that prizes have been awarded and between plays can display prescribed messages about the products to be promoted, the manufacturer, the establishment or the game itself. It is an object of this invention to provide a promotional game machine which is simple to use and can be readily changed to promote different products.

It is a further object of this invention to provide a game machine which can initiate the awarding of prizes in accordance with the objects displayed and in amounts commensurate with the number and type of product or symbol matches displayed.

It is yet another object of this invention to provide a game machine which can only be played by a given patron a fixed number of times within a fixed period.

Other objects and features of the invention will be pointed out in the following description and claims and illustrated in the accompanying drawings which disclose, by way of example, the principles of the invention and the best modes which have been presently contemplated for carrying them out.

BRIEF DESCRIPTION OF THE DRAWINGS

In the drawings in which similar elements are given similar reference characters.

DESCRIPTION OF THE PREFERRED EMBODIMENT

Figure 1:
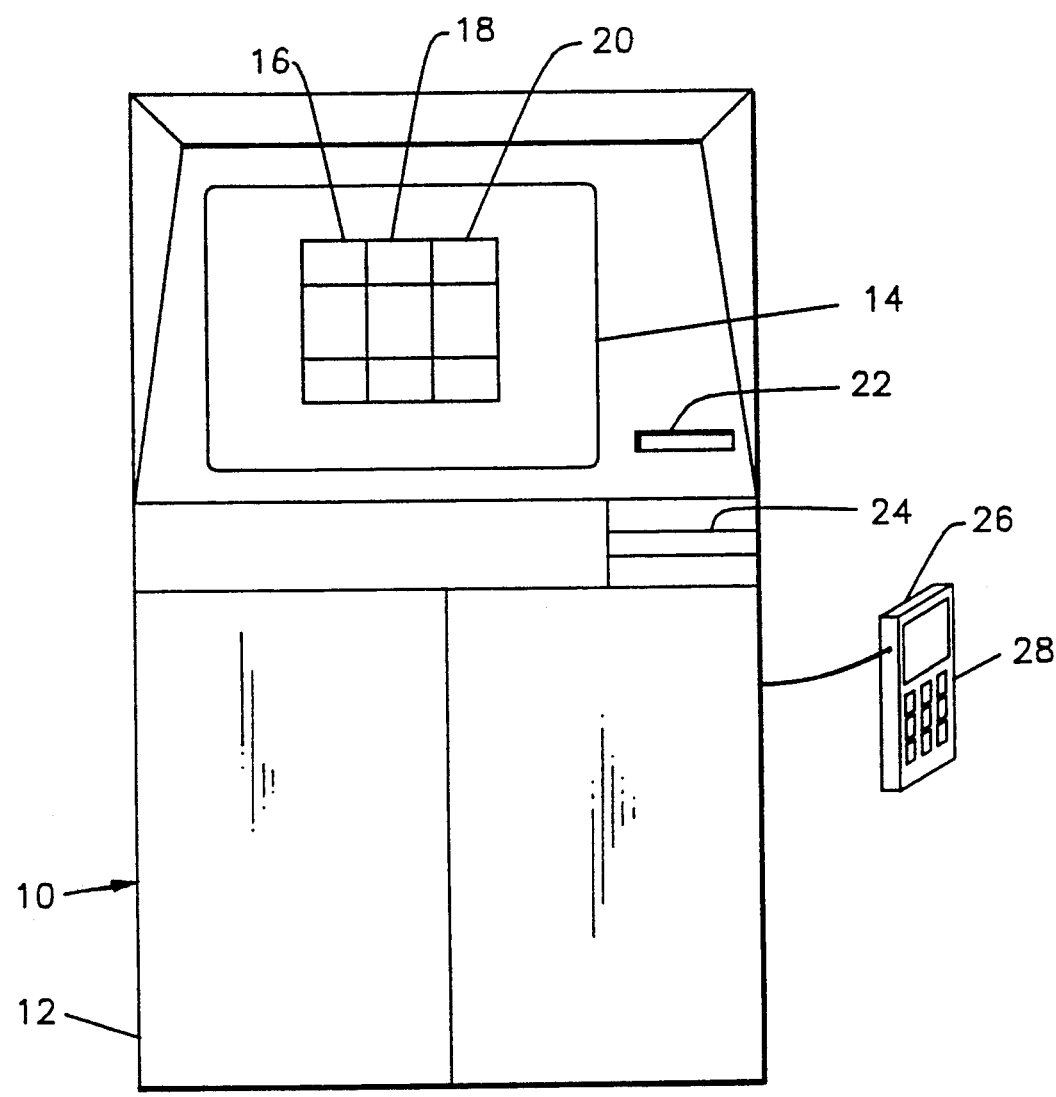
FIG. 1 is a front view of a game machine constructed in accordance with one embodiment of the invention.

Turning now to FIG. 1, there is shown one embodiment of a game machine for play according to the disclosed method. Game machine 10 includes a cabinet 12 to house the various electronic and mechanical devices required (not shown). In the upper portion of cabinet 12 is a video screen 14 which may be a TV monitor or the like. Optionally, video screen 14 may be positioned in a location remote from cabinet 12, such as at an elevated level which can be more readily seen by store patrons. The video screen 14 displays computer-generated representations of the peripheral surfaces of three adjacent wheels 16, 18 and 20, which are permitted to rotate independently of one another so that the effect is the same as watching the display of mechanical slot machines. Rather than include depictions of lemons, cherries and other non-significant symbols, the wheels each carry a series of representations of products that a manufacturer wishes to promote. Symbols of the manufacturer, and perhaps the store, which can act as wild cards may also be included. Or, supermarket wishing to promote certain products or services can place representations of those products and services on the wheels, as well as store symbols which may act as wild cards. In either case, the representations of at least some of the products or services must appear on at least two of the wheels so that matches can occur. Manufacturer and store symbols may appear on one or more than one of the wheels. Which combinations will be awarded prizes and the magnitude of such prizes can be determined.

Figure 2:
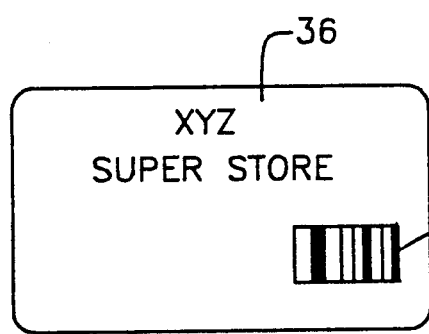
FIG. 2 is a top plan view of a first form of game card which can be employed with the game machine of FIG. 1.
Figure 3:
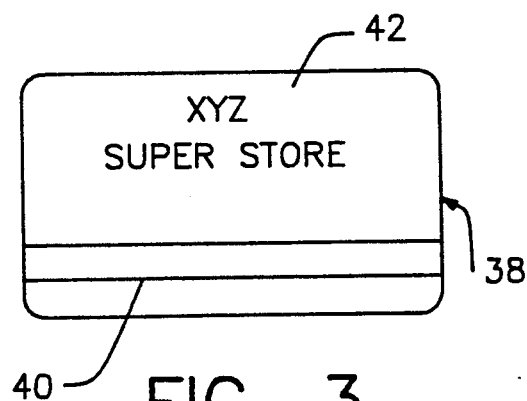
FIG. 3 is a top plan view of another form of game card which can be employed with the game machine of FIG. 1.

The game machine 10 is operated by the insertion of a game card, such as 32 shown in FIG. 2 or 38 as shown in FIG. 3, into slot 22 of game machine 10. Game card 32 has a bar-code section 34 bearing a unique code representing a particular patron. Preferably, the bar-code section 34 will also include a portion coded with information on the establishment or chain of establishments in which the game card 32 may be played. For example, each supermarket chain and each store in the chain may be identified by coded characters. The game machine 10 can then be set to operate only if it reads the code of the chain in which it is placed or, if special promotions in one or more stores are conducted, only those game cards 32 which contain the codes of the chain and those selected stores would operate the game machine 10. Similarly, game card 38 has a magnetic stripe 40 upon which has been recorded a similar unique code representing a particular patron and, desirably, the establishment or chain of establishments in which game card 38 can be played. The name of the chain or the particular establishment at which the game card is valid may be printed upon the card itself, as at 36 on game card 32, or 42 on game card 38.

Located behind slot 22 will be a suitable reader for reading bar codes of the type contained on game card 32 or the magnetic stripe code of the type contained on game card 38. The data read by the reader (not shown) will be used as set out below.

A further slot 24 is provided to dispense coupons representing the prizes awarded. Behind slot 24 may be a feeding mechanism (not shown) to dispense pre-printed stored coupons or a printer (not shown) which first prints the required coupon on a roll of blank paper or partially pre-printed forms on which may appear the store name, address, advertising information, etc., and which then feeds the completed, severed coupon through slot 24.

Figure 8A:
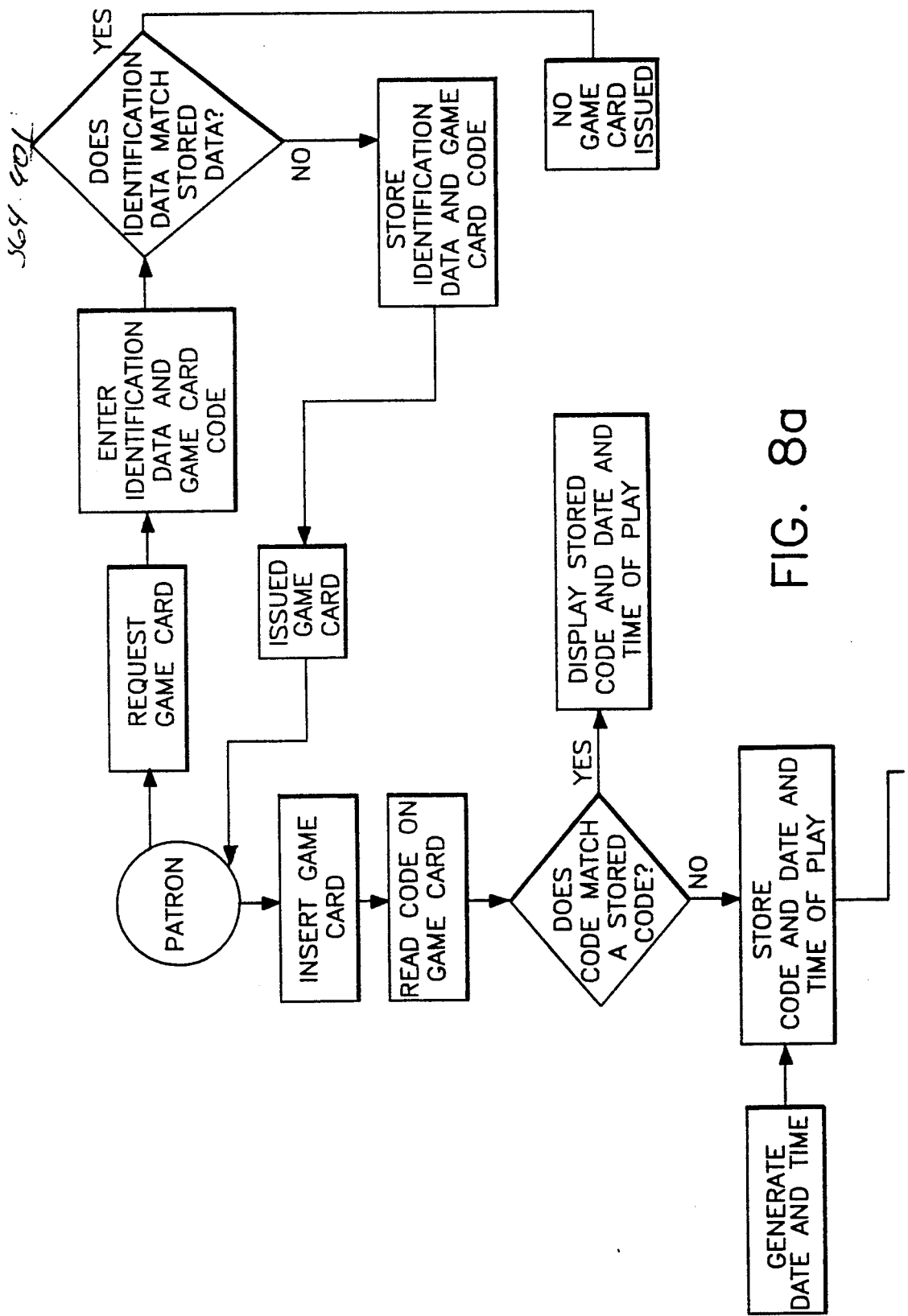
FIGS. 8a and 8b together are a flow chart of the operation of the game machine of FIG. 1.
Figure 8B:
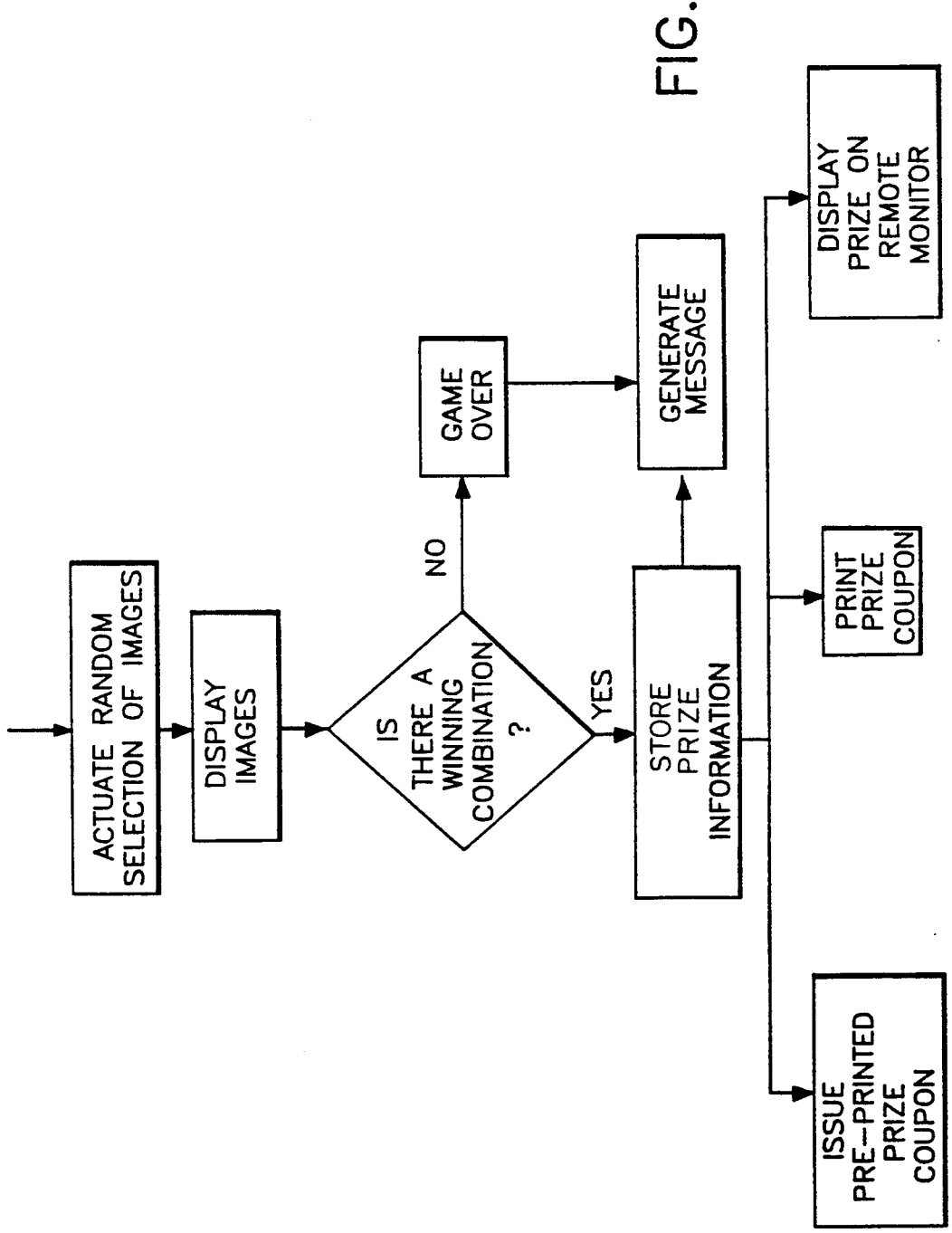

Referring to the flow chart of FIGS. 8a and 8b, the method and the apparatus for carrying out the promotional game are set out. First, a patron goes to a service desk or the like and requests a game card. The service desk personnel will take certain identification data from the patron which clearly identifies that patron only. The patron's name, address, social security number, driver's license number and similar data can be used. The data is entered by depressing the keys of keypad 28 of input device 26. (See FIG. 1.) This identification data is permanently stored in the input device 26.

Next, the identification data is compared with like identification data stored in the input device 26 to determine if this identification data has been stored previously. If it matches previously stored identification data it means the patron already has been issued a game card 32 or 38 and no new game card is issued, and the fact of the match is shown by a suitable display. In the absence of a match, a game card 32 or 38 is issued to the patron. The number of game card 32 or 38 is permanently stored in input device 26 with the identification data of the patron so that the patron can be identified by his identification data or game card number. In the event a game card is lost, the patron can report the loss to persons at the service desk who will enter additional data into the file of the patron in the input device 26 which will render the lost game card invalid for play in game machine 10. A new game card 32 or 38 with a new code can then be issued to such patron. At prescribed intervals, the input device 26 may be connected by a suitable cable (see FIG. 1) to the game machine 10 to upload the codes of the invalid game cards to a permanent memory location in game machine 10. Alternatively, a keyboard (not shown) may be temporarily connected to the game machine 10 to enter invalid game card codes directly into the permanent memory location of game machine 10. Thus, if any so-called lost card is thereafter inserted for play, the game machine 10 will not be activated. A message may be displayed on video screen 14 or at the service desk to indicate that this is an invalid game card.

The patron takes his game card and inserts it into slot 22 of game machine 10 which reads the code in bar code section 34 on game card 32 or the code on magnetic stripe 40 of game card 38. The portion of the game card code bearing the establishment information may first be compared with establishment codes permanently stored in game machine 10 to ascertain that the game card is being played in an establishment in which it is accepted. If the game card is not accepted by this particular establishment, a suitable message to that effect will be displayed on video screen 14 and play will not be initiated. On the other hand, if the establishment information in the game card code is acceptable, the random selection device in game machine 10 will be actuated to initiate play.

In order to more equitably distribute the prizes awarded, the establishment may desire to limit how often each game card may be played during a preselected period of time. The number of plays permitted within the preselected period of time may be limited to one or may be selected to be a number greater than one. For example, each card may be limited to only one play during each twenty-four hour period, five plays in a one week period, etc. In order to accomplish this result, each time the insertion of a game card into slot 22 of game machine 10 results in actuation of the random selection device of the game machine, the code on that game card is stored in a temporary memory location in game machine 10. Stored along with the game card code are the date and time of play, as determined by an internal clock in game machine 10. If desired, the game machine 10 can also be programmed to store information regarding prizes won by the patron, if any. As the patron inserts his game card 32 or 38 into slot 22 of game machine 10, the game machine can compare the game card code on that card with all of the game card codes previously stored in the temporary memory of game machine 10 to determine whether the random selection device should be actuated. In the event game machine 10 determines that the game card code has not been played the maximum permissible number of times, the random selection device will be actuated and the patron's game card code, the date and the time of play again stored in the temporary memory location in game machine 10. Should the game machine 10 determine that the game card code has already been played the maximum permissible number of times, the random selection device will not be actuated, and instead, the dates and times of each of the patron's plays would be displayed on video screen 14 along with a video and/or audio message indicating that play has been denied.

In a less preferred embodiment, all possible game card codes could be permanently stored in game machine 10, and each time a particular game card is played a temporary notation could be made within game machine 10 as to the date and time of play. This additional information could then be used by the game machine to determine if that game card can be played at the time of presentation.

At the end of the preselected play period, such as at the end of each twenty-four hour period or the end of each week, the internal clock in game machine 10 can be used to clear all of the data regarding those patrons who had played within the preselected period from the temporary memory location of the game machine. Therefore, at the end of the preselected period, each patron will be able to recommence his playing of the game machine 10. The clearing of the data stored in the temporary memory will not affect that information stored in the permanent memory, such as the record of invalid game codes.

As set out above, the display during the operation of the random selection device in response to the insertion of a game card 32, 38 is the moving peripheral surfaces of three independently moving wheels 16, 18 and 20 until they stop at a cursor which indicates the final settings of the three wheels 16, 18 and 20. Although three wheels are described, it should be understood that game machine 10 may include at least two wheels or any number of wheels greater than two. The peripheral surfaces of the wheels are each marked with the images of a series of products or services to be promoted by a manufacturer or the establishment. These may include a series of products of a particular manufacturer or distributor, the products and services of the establishment itself, or combinations of any or all of the above. In addition, images of the logos of the manufacturer, distributor or establishment may be placed on the wheel surfaces to act as wild cards. No actual wheels exist, but these images result from the operation of the software within the game machine 10 in a well-known manner. The software required to generate the various images, to determine the odds of forming a match, to display a particular message and to perform any other task in connection with the operation of game machine 10 is recorded on a disk or other storage media insertable in game machine 10. Therefore, any of these parameters may be changed by merely replacing the storage disk with a new disk having the desired data. For example, the products or services whose images appear upon play of game machine 10 can be changed merely by inserting a new disk having the proper information. Similarly, a new storage disk could be supplied to change the odds that a match will be formed on any one play of game machine 10. To increase the odds that a march will be formed for any one particular product, the number of times the image of that product appears on each wheel is increased. Similarly, the odds of forming a match for a product can be decreased by decreasing the number of times images of that product appear on each wheel.

Figure 4:
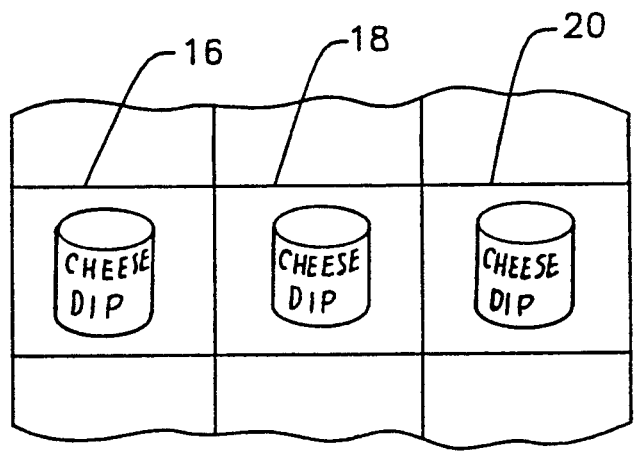
FIG. 4 is a front view of one possible display on the screen of the game machine of FIG. 1.
Figure 5:
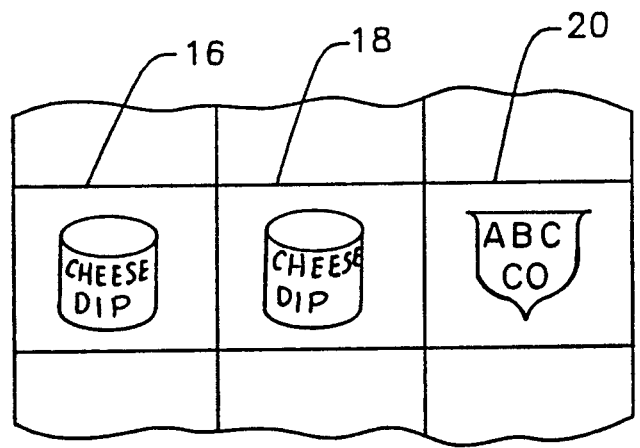
FIG. 5 is a front view of another possible display on the screen of the game machine of FIG. 1.

Based upon the representations which come to rest adjacent the cursor at the end of the spinning of wheels 16, 18 and 20, a prize can be awarded. Preferably, the prize will be the actual product or service shown by the match on the wheels 16, 18 and 20, and the size of the award will be based upon the particular combinations shown by the wheels 16, 18 and 20. For example, as shown in FIG. 4, the wheels 16, 18 and 20 have each come to rest showing cheese dip, while in FIG. 5 wheels 16 and 18 show cheese dip while wheel 20 shows the manufacturer's logo. At the option of the manufacturer, the concurrence of the three symbols in FIG. 4 may result in 10 packages of cheese dip being awarded, while the combination of the two symbols on wheels 16 and 18 with the manufacturer's logo used as a wild card on wheel 20 may result in an award of only three packages of cheese dip or cents-off coupons for matched products. As is well known, the program controlling the random selection device can be set to insure that a given number of prizes are awarded per a given number of plays and to assure a given distribution of the prizes is achieved in concert with the manufacturer's wishes. As an alternative to insure that prizes are awarded regularly and in the desired value, the game machine 10 program may be set to display given matches a minimum number of times in a prescribed period if prizes have not been awarded or have not been awarded in sufficient numbers during that period by the random selection process. Thus, for example, game machine 10 may be programmed to form a certain match at least once in a twenty-four hour period to maintain patron interest. As to each patron the selection would be random.

Figure 6:
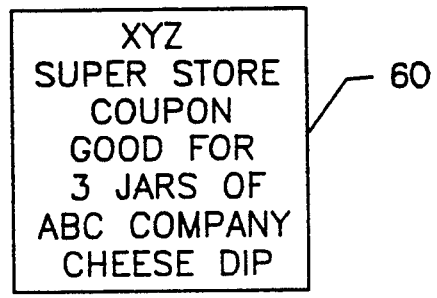
FIG. 6 is a top plan view of a coupon which may be issued by the game machine of FIG. 1.
Figure 7:
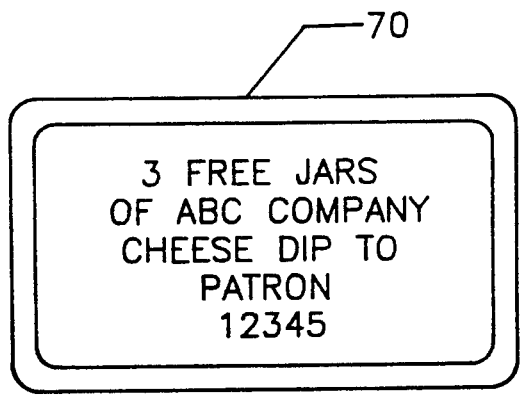
FIG. 7 is a front view of a screen at a location remote from the game machine of FIG. 1.

Once it is determined that the display shows a winning combination, a signal is produced to indicate that a prize is to be awarded and what that prize is. This signal may be employed to dispense a pre-recorded, pre-stored coupon contained within game machine 10, or to cause the printing within game machine 10 of a coupon (see 60 in FIG. 6) redeemable for the product shown and in the quantity indicated. The signal may also be directed to a display 70 at a service counter (see FIG. 7) where personnel at the counter may provide the required coupon or mark the actual item so that it is free at the check-out counter. The signal may also be used to sound bells, flash lights, provide some audio message or cause a display on the video screen 14 of the game machine 10 to announce that the patron playing has won a prize and any other information desired to be disseminated.

In between plays of the game machine 10, a series of messages may be displayed on video screen 14 promoting the products involved in the game, manufacturer's information as to its products, establishment messages, inducements to play the game and lists of the prizes awarded, and any other information to be called to the patrons' attention.

In order to keep game machine 10 simple to operate by patrons and simple to maintain by generally available store personnel, game machine 10 is not provided with a keyboard. Since no keyboard is available for instructing game machine 10 to perform certain operations, all such instructions are supplied by inserting maintenance cards (not shown) into slot 22. In all outward appearances, the maintenance cards are the same as game cards 32 or 38, except that the coded information appearing in bar code sections 34 or magnetic stripes 40 are not game card codes, but rather are instruction codes recognizable by game machine 10. Thus, one maintenance card may contain a code for instructing game machine 10 to assemble various statistical data which may be obtained. Statistical information regarding the patrons playing the game machine 10, their frequency of play, prizes won, etc., may be summarized in various tables to indicate, for example: (1) the total number of plays during the prescribed period, i.e., twenty-four hours, one week, etc.; (2) the number of plays hour-by-hour; (3) prizes won and the profile of the persons who won; (4) the number of prizes won and the total value of the prizes awarded, etc. The code on the maintenance card may further instruct game machine 10 to print this statistical data either on the printer within the game machine or at a remote location.

Another maintenance card may include a code for instructing the game machine to accept replays on some or all of the game cards, such as by reducing by one the number of times each of the game card codes have been stored in the temporary memory of the game machine.

The code on yet another maintenance card may instruct the game machine to update and/or change the program in the game machine. Thus, as a storage disk containing new game parameters is placed in the game machine 10, the information thereon will not be uploaded into the operating memory of game machine 10 until the maintenance card bearing the proper instruction code has been inserted into the card reader via slot 22. The proper maintenance card will instruct the game machine 10 to replace the game parameters in its operating memory with the game parameters on the newly inserted disk. Additional maintenance cards may be provided for instructing game machine 10 to perform other tasks, such as downloading or uploading card and play information to a remote computer. In less preferred embodiments, all of these instructions may be provided to game machine 10 through the use of input device 26 or some other keyboard temporarily connected to game machine 10.

Games of this nature may be employed usefully at the point of sale in retail establishments such as supermarkets, fast food restaurants, auto parts stores, home centers, toy stores and the like. The ability to charge back to a sponsor, such as a manufacturer or distributor, the availability of recorded information regarding the total number of prizes won and the total value of prizes awarded as above set forth, the absence of any need for special goods packaging or specially distributed game cards, and the elimination of the need to distribute a plethora of coupons which will never be redeemed, all coupled with the ability to easily change promotions at will, provides a uniquely effective promotional tool.

As will be readily appreciated, laws bearing on gambling and the lotteries limit certain types of promotions involving an element of chance, particularly where the purchase of goods or services is required as a pre-condition for entry into the game. Games according to the present invention can be, and are intended to be, operated in conformity with applicable laws. Such laws ordinarily require that the patron or prospective patron be allowed to enter any game of chance without purchasing anything or paying money to acquire an entry. Ordinarily, such laws are satisfied if the patron has the opportunity to acquire a game card without a purchase.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

We claim:

1. A promotional gaming method for inducing potential customers to come to a particular establishment, comprising the steps of:
    a) providing a game machine which is played for no consideration;
    b) establishing at least two separate series of images on said game machine, said images including representations of products, services or a combination of products and services, at least some of said representations being present in two of said series;
    c) randomly moving said at least two series with respect to one another so that one representation of a product or service in one series may at times be aligned with one representation of said product or service in another series to form a match; and
    d) awarding a prize to playing patrons upon the formation of said match, said prize being selected from the group consisting of said product or service whose representations on said at least two series match, a product or service which is related to said product or service whose representations on said at least two series match, and a retail product or service which is available from said establishment.

2. A method as claimed in claim 1, wherein said prize is said product or service whose representations on said at least two series match.

3. A method as claimed in claim 1, wherein said method includes the further steps of:
    a) distributing game cards to patrons, each one of said game cards being coded with a patron code to identify a receiving patron and an establishment code to identify said establishment; and
    b) automatically reading said game cards when inserted into said game machine and initiating said random movement step responsive to said establishment code meeting predetermined criteria.

4. A method as claimed in claim 1, wherein said method includes the further steps of:
    a) distributing game cards to patrons, each one of said game cards being coded with a patron code to identify a receiving patron; and
    b) automatically reading said game cards when inserted into said game machine and initiating said random movement step responsive to the reading of said game cards.

5. A method as claimed in claim 1, wherein said representations of products comprise images of packaging for said products.

6. A method as claimed in claim 4, wherein said random movement step is performed by a random movement device in said game machine so that the relative positions of said representations do not depend upon information coded on said game cards.

7. A method as claimed in claim 1, wherein said establishing step includes the step of establishing at least three separate series of images, at least one of said series including wild card symbols selected from the group consisting of manufacturer symbols, establishment symbols and combinations of manufacturer and establishment symbols, at least some of said representations being common to at least two of said three series, and wherein said prize is awarded in a magnitude which depends upon the alignment of one of said wild card symbols with said representations in said match.

8. A method as claimed in claim 7, wherein said method includes the further steps of:
    a) distributing game cards to patrons, each one of said game cards being coded with a unique code to identify a receiving patron and an establishment code to identify said establishment; and
    b) automatically reading said game cards when inserted into said game machine and initiating said random movement step responsive to said establishment code meeting predetermined criteria.

9. A method as claimed in claim 7, wherein said method includes the further steps of:
    a) distributing game cards to patrons, each one of said game cards being coded with a unique code to identify a receiving patron; and
    b) automatically reading said game cards when inserted into said game machine and initiating said random movement step responsive to the reading of said game cards.

10. A method as claimed in claim 9, wherein each one of said game cards is coded with a unique bar-code series.

11. A method as claimed in claim 9, wherein each one of said game cards is coded with a unique magnetic code upon a magnetic stripe on said game cards.

12. A method as claimed in claim 9, wherein identification data regarding each patron who requests one of said game cards is recorded and compared to previously recorded identification data so as to prevent the issuance of more than said one game card to each patron.

13. A method as claimed in claim 9, wherein said unique code is read by said game machine to initiate said random movement step and is stored within said game machine for a selectable period of time.

14. A method as claimed in claim 13, wherein said stored unique code is erased from storage at the end of said selectable period of time.

15. A method as claimed in claim 13, wherein said unique code of an inserted game card is compared with all stored codes and the initiation of said random movement step is prevented if said unique code of said inserted game card matches one of said stored unique codes whereby said random movement step can only be initiated once within said selectable period of time by a particular unique code.

16. A method as claimed in claim 13, wherein said unique code of an inserted game card is compared with all stored unique codes and the initiation of said random movement step is prevented if said unique code of said inserted game card is found to have been stored a selected number of times by said game machine within said selectable period of time.

17. A method as claimed in claim 16, wherein said stored unique codes are erased from storage at the end of said selectable period of time.

18. A method as claimed in claim 1, wherein said establishing step includes the step of displaying a visual representation of a peripheral surface of each of at least two individual wheels in said game machine, each of said wheels containing one of said series of images, at least some of said representations being common to two of said individual wheels, and wherein said step of randomly moving said at least two series includes the step of causing said individual wheels to rotate independently in said visual representation with respect to one another so that various combinations of said representations on said at least two wheels can be read out at a read-out point on said game machine.

19. A method as claimed in claim 18, wherein the step of awarding a prize includes the step of issuing a coupon by said machine exchangeable for said prize.

20. A method as claimed in claim 19, wherein said coupon is pre-stored in said game machine.

21. A method as claimed in claim 19, wherein said coupon is printed by said game machine in response to the formation of said match.

22. A method as claimed in claim 18, wherein the step of awarding a prize includes the step of providing a signal to a location remote from said game machine instructing that said prize be awarded in a specified quantity.

23. A method as claimed in claim 18, wherein said game machine includes a video screen and said step of displaying said representation of said wheels includes the step of displaying said representation on said video screen, the method further comprising the step of displaying advertisements or inducements to play the game upon said video screen between plays by patrons.

24. A promotional game apparatus for inducing potential customers to come to a particular establishment, comprising:
   a) display means for establishing at least two separate series of images including representations of products, services or a combination of products and services, at least some of said representations being present in two of said series, said at least two series being capable of random movement with respect to one another so that at least one representation of a product or service in one of said series at times may be aligned with at least one representation of said product or service in another of said series to form a match;
   b) movement means for moving said at least two series with respect to one another;
   c) activating means for activating said movement means for no consideration;
   d) means for signaling that said match exists at a read-out point; and
   e) means for awarding a prize upon the occurrence of said match, said prize being selected from the group consisting of said product or service whose representations on said at least two series match, a product or service which is related to said product or service whose representations on said at least two series match, and a retail product or service which is available from said establishment.

25. The promotional game apparatus as claimed in claim 24, wherein said representations of products comprise images of packaging for said products.

26. The promotional game apparatus as claimed in claim 24, wherein said means for awarding a prize includes means for awarding a prize consisting of said product or service whose representations in said at least two series match.

27. A promotional game apparatus for inducing potential customers to come to a particular establishment, comprising:
   a) display means for establishing three separate series of images including product representations, service representations, manufacturer symbols, establishment symbols and combinations thereof, at least some of said representations being common to at least two of said three series, said three series being capable of random movement with respect to one another so that at least one representation of a product or service in one of said three series at times may be aligned with at least one representation of said product or service in at least one other of said three series to form a match;
   b) movement means for moving each of said three series independently of one another;
   c) activating means for activating said movement means for no consideration;
   d) means for signaling that said match exists at a read-out point; and
   e) means for awarding a prize upon the occurrence of said match, said prize being selected from the group consisting of said product or service whose representations on said at least two series match, a product or service which is related to said product or service whose representations on said at least two series match, and a retail product or service which is available from said establishment.

28. The promotional game apparatus as claimed in claim 27, wherein said representations of products comprise images of packaging for said products.

29. A promotional game apparatus for inducing potential customers to come to a particular establishment, comprising:
   a) a game card coded with a unique code to identify a receiving patron;
   b) display means for establishing three separate series of images including product representations, service representations, manufacturer symbols, establishment symbols and combinations thereof, at least some of said representations being common to at least two of said three series, said three series being capable of random movement with respect to one another so that at least one representation of a product or service in one of said three series at times may be aligned with at least one representation of said product or service in at least one other of said three series to form a match;
   c) movement means coupled to said display means for moving said three series independently with respect to one another and for causing each one of said three series to present a single one of said images at a read-out point;
   d) reading means connected to said movement means for reading said unique code and for signaling said movement means to move said three series in response to said unique code;
   e) detection means for determining when said match has been formed at said read-out point; and f) means responsive to said detection means for indicating the award of a prize upon the formation of said match, said prize being selected from the group consisting of said product or service whose representations on said at least two series match, a product or service which is related to said products or services whose representations on said at least two series match, and a retail product or service which is available from said establishment.

30. The promotional game apparatus as claimed in claim 29, wherein said representations of products comprise images of packaging for said products.

31. A promotional game apparatus for inducing potential customers to come to a particular establishment, comprising:
  a) a game card coded with a unique code, a first portion of said unique code comprising a patron code for identifying a receiving patron and a second portion of said unique code comprising an establishment code for identifying said establishment;
  b) display means for establishing three separate series of images including product representations, service representations, manufacturer symbols, establishment symbols and combinations thereof, at least some of said representations being common to at least two of said three series, said three series being capable of random movement with respect to one another so that at least one representation of a product or service in one of said three series at times may be aligned with at least one representation of said product or service in at least one other of said three series to form a match;
  c) movement means coupled to said display means for moving said three series independently with respect to one another and for causing each one of said three series to present a single one of said images at a read-out point;
  d) reading means connected to said movement means for reading said first and second portions of said unique code and for said three series in response to predetermined establishment codes;
  e) detection means for determining when said match has been formed at said read-out point; and
  f) means responsive to said detection means for indicating the award of a prize upon the formation of said match, said prize being selected from the group consisting of said product or service whose representations on said at least two series match, a product or service which is related to said products or services whose representations on said at least two series match, and a retail product or service which is available from said establishment.

32. The promotional game apparatus as claimed in claim 31, wherein said representations of products comprise images of packaging for said products.

* * * * *

UNITED STATES PATENT AND TRADEMARK OFFICE
CERTIFICATE OF CORRECTION

PATENT NO. : 5,231,568

DATED : July 27, 1993

INVENTOR(S) : Leopold Cohen, Charles I. Bernhaut, and Robert T. Gindell

It is certified that error appears in the above-indentified patent and that said Letters Patent is hereby corrected as shown below:

[57] ABSTRACT, line 13, after "matched" insert --.--.
Column 2, lines 2 through 4, delete "depend upon the number of product representation matches on the game screen or display".
Column 4, line 23, after "Or," insert --a--.
Column 6, line 48, delete "32, 38".
Column 7, line 12, delete "march" and insert therefor --match--.
Column 7, line 20, after "awarded." insert --The prizes may be the products or service forming the match, or a product or service related thereto, or may be a retail product or service available from the establishment.--
Column 10, line 59, after "stored" insert --unique--.
Column 14, line 12, after "for" insert --signalling said movement means to move--.

Signed and Sealed this

Twenty-second Day of March, 1994

Attest:

BRUCE LEHMAN

Attesting Officer

Commissioner of Patents and Trademarks